(12) United States Patent
Harrington et al.

(10) Patent No.: US 7,146,515 B2
(45) Date of Patent: Dec. 5, 2006

(54) SYSTEM AND METHOD FOR SELECTIVELY EXECUTING A REBOOT REQUEST AFTER A RESET TO POWER ON STATE FOR A PARTICULAR PARTITION IN A LOGICALLY PARTITIONED SYSTEM

(75) Inventors: Bradley Ryan Harrington, Austin, TX (US); Chetan Mehta, Austin, TX (US); Milton Devon Miller, II, Austin, TX (US); Michael Anthony Perez, Cedar Park, TX (US); David Lee Randall, Leander, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 10/177,415

(22) Filed: Jun. 20, 2002

(65) Prior Publication Data

US 2003/0236972 A1 Dec. 25, 2003

(51) Int. Cl.
*G06F 1/26* (2006.01)
(52) U.S. Cl. ...................... 713/324; 713/300
(58) Field of Classification Search ................ 713/2, 713/310, 324, 300; 714/1, 7
See application file for complete search history.

(56) References Cited

U.S. PATENT DOCUMENTS 5,497,497 A  3/1996  Miller et al. ............... 395/800
5,596,759 A  1/1997  Miller et al. ............... 395/750
5,724,527 A  3/1998  Karnik et al. .............. 395/308

(Continued)

FOREIGN PATENT DOCUMENTS

JP  3138753  6/1991

OTHER PUBLICATIONS

IBM Technical Disclosure Bulletin, "Recovery from Single Critical Hardware Resource Unavialability", vol. 36, No. 08, Aug. 1993, pp. 607-612.

(Continued)

*Primary Examiner*—Lynne H. Browne
*Assistant Examiner*—Tse Chen
(74) *Attorney, Agent, or Firm*—Duke W. Yee; Thomas E. Tyson; Theodore D. Fay, III (57) ABSTRACT

A system, method, and computer program product are disclosed for executing a reliable warm reboot of one of multiple partitions included in a logically partitioned data processing system. The data processing system includes partition hardware. A request to reboot a particular partition is received within the partition where the particular partition includes multiple processors. Prior to executing the reboot request, the partition hardware is set to a predetermined state. The reboot request is then executed within the particular partition. The predetermined state is preferably achieved by resetting the partition hardware to a predetermined state.

7 Claims, 4 Drawing Sheets

U.S. PATENT DOCUMENTS

| | | | | |
|---|---|---|---|---|
| 5,729,675 | A | 3/1998 | Miller et al. | 395/183.12 |
| 5,737,615 | A | 4/1998 | Tetrick | 395/750.06 |
| 5,825,649 | A | 10/1998 | Yoshimura | 364/187 |
| 5,854,896 | A | 12/1998 | Brenner et al. | 395/200.51 |
| 5,867,658 | A | 2/1999 | Lee | 395/200.52 |
| 5,867,703 | A | 2/1999 | Miller et al. | 395/651 |
| 6,158,000 | A | 12/2000 | Collins | 713/1 |
| 6,253,304 | B1 | 6/2001 | Hewitt et al. | 712/6 |
| 6,314,515 | B1 | 11/2001 | Miller et al. | 713/1 |
| 6,434,696 | B1 * | 8/2002 | Kang | 713/2 |
| 6,539,472 | B1 * | 3/2003 | Fujishima | 713/2 |
| 6,725,317 | B1 * | 4/2004 | Bouchier et al. | 710/312 |
| 6,795,930 | B1 * | 9/2004 | Laurenti et al. | 713/324 |
| 6,820,207 | B1 * | 11/2004 | Dawkins et al. | 713/324 |
| 2002/0124166 | A1 * | 9/2002 | Lee et al. | 713/100 |

OTHER PUBLICATIONS

IBM Technical Disclosure Bulletin, "Coordinating Multiple Server Partitions to Enter Power-Save State", vol. 39, No. 06, Jun. 1996, pp. 235-239.

IBM Research Disclosure 444202, "Methods of Intercommunication amoung Common Service Processor, Hardware System Console, and Firmware Partition Manager for Logical Partition Management, Instantiation, and Termination", Apr. 2001, pp. 700-701.

* cited by examiner

SYSTEM AND METHOD FOR SELECTIVELY EXECUTING A REBOOT REQUEST AFTER A RESET TO POWER ON STATE FOR A PARTICULAR PARTITION IN A LOGICALLY PARTITIONED SYSTEM

BACKGROUND OF THE INVENTION

1. Technical Field

The present invention relates generally to the field of computer systems and, more specifically to a system, method, and computer program product for executing a reliable warm reboot of a partition that includes multiple processors in logically partitioned systems.

2. Description of Related Art

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, may be assigned a non-overlapping subset of the platform's hardware resources. In some implementations, a percentage of system resources is assigned such that system resources are essentially time-sliced across partitions. These platform allocable resources include one or more architecturally distinct processors with their interrupt management area, regions of system memory, and input/output (I/O) adapter bus slots. The partition's resources are represented by its own resources list typically created and maintained by the systems underlying firmware and available to the OS image.

Each distinct OS or image of an OS running within the platform is protected from each other such that software errors on one logical partition can not affect the correct operation of any of the other partitions. At a given time, this is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus at a given time, each image of the OS, or each different OS, directly controls a distinct set of allocable resources within the platform.

The ability to reboot one of multiple partitions in a logically partitioned system is an important requirement in such a system. This requirement stems from the fact that partitions are supposed to act and behave like independent systems. An independent computer system may be restarted using either a cold reboot or a warm reboot.

A cold reboot is defined as restarting the computer system by cycling the power to the computer system off and then back on. When a cold reboot is executed, the various hardware components in the system are reset to a particular, defined state. When a processor is reset, the processor loses all history of what it had been doing prior to being reset. It does not continue to transmit I/O requests, and does not anticipate the receipt of any particular I/O response. When an I/O adapter is reset, it also does not continue to transmit I/O responses, and does not anticipate the receipt of any particular I/O request.

A warm reboot is defined as restarting the computer system without cycling the power off and then back on. In a cold boot, system components are tested prior to initialization to ensure that the hardware is functioning properly before control can be passed to the OS. In a warm boot scenario, since the system is assumed to be operating prior to the reboot request, testing of certain system components can be skipped thereby speeding up the boot. Obviously in an LPAR environment, a cold boot is not an option since it impacts not only the partition being rebooted but all other partitions as well because the power to the system is cycled on and then back off.

Typically, a warm reboot is executed from the operating system level. During a warm reboot of a partition that includes multiple processors, I/O activity in the partition being rebooted may continue. Processors in the partition that are not the processor that initially received the reboot request may be transmitting data to an I/O adapter when the reboot request occurs. In addition, the I/O adapters may be transmitting data back to the processors.

It is not practical, however, to reboot a partition in a logically partitioned system using the same, cold reboot method used in independent systems. When an independent system is rebooted using a cold, or hard reboot, the power of the system is cycled off and then back on. When a reboot of an independent system is executed, in most cases it is treated in the same way as a cold reboot. Thus, when an operating system initiates a reboot and the power is cycled off and then back on for the system. This approach is not practical for rebooting only one of the multiple partitions of a logically partitioned system. Power to the logically partitioned hardware cannot be cycled for just one partition. Cycling the power would affect all partitions.

When a reboot request is issued from the OS to reboot a partition, it is sent to one of the processors in the partition. This processor can control the processes/tasks running on it so prior to passing the reboot request to firmware it is able to cease all I/O activity to and from it. If the partition had only one processor, there is a mechanism to stop all I/O activity prior to the start of a partition reboot. In the case where a partition consists of multiple processors, the other processors have no knowledge of the reboot request until the information in conveyed to them by the processor that received the reboot request. Since there is no way to send a simultaneous request to all processors in a partition, during the time that it takes the "receiving" processor to inform the other processors in the partition of the pending reboot request, they may have already initiated I/O transaction(s). These pending I/O transactions cause problems when the system is being rebooted.

Executing a warm reboot in just one partition of a logically partitioned system can cause unreliable results when the partition includes multiple processors. In the prior art, when a warm reboot occurs in a partition that includes multiple processors, one processor will receive the request to reboot. That processor will then tell the other processors to stop processing in preparation for a reboot. A problem occurs when one or more of these other processors has one or more outstanding I/O requests as a reboot is initiated. When the reboot occurs, system firmware is in control. As it proceeds to reboot the system an I/O adapter may respond to an I/O request issued prior to the reboot request from one of the processors. However, the processor that originally transmitted the request is not executing the task which produced the request. The firmware in effect receives an unsolicited I/O interrupt. Unable to determine if the I/O response is a result of an I/O problem or a previously issued request, the reboot fails.

Therefore, a need exists for a method, system, and product for executing a reliable reboot in a partition in a logically partitioned system where the partition is comprised of multiple processors.

SUMMARY OF THE INVENTION

A system, method, and computer program product are disclosed for executing a reliable warm reboot of one of multiple partitions included in a logically partitioned data processing system. The data processing system includes partition hardware. A request to reboot a particular partition is received within the partition where the particular partition includes multiple processors. Prior to executing the reboot request, the partition hardware is set to a predetermined state. The reboot request is then executed within the particular partition. The predetermined state is preferably achieved by resetting the partition hardware to its power-on state.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for providing a reliable warm reboot of a particular partition in a logically partitioned system where the particular partition includes multiple processors. When a request to execute a warm reboot of a partition is received, the hardware allocated to that partition is reset to a predetermined state before the warm reboot request is executed. The hardware is reset to a "power-on" state such that the processors are reset and the I/O adapters are reset. When the processors and I/O adapters are reset, they lose all execution history, and I/O processing is halted. Once the processors and I/O adapters are reset, the warm reboot request is executed.

Figure 1:
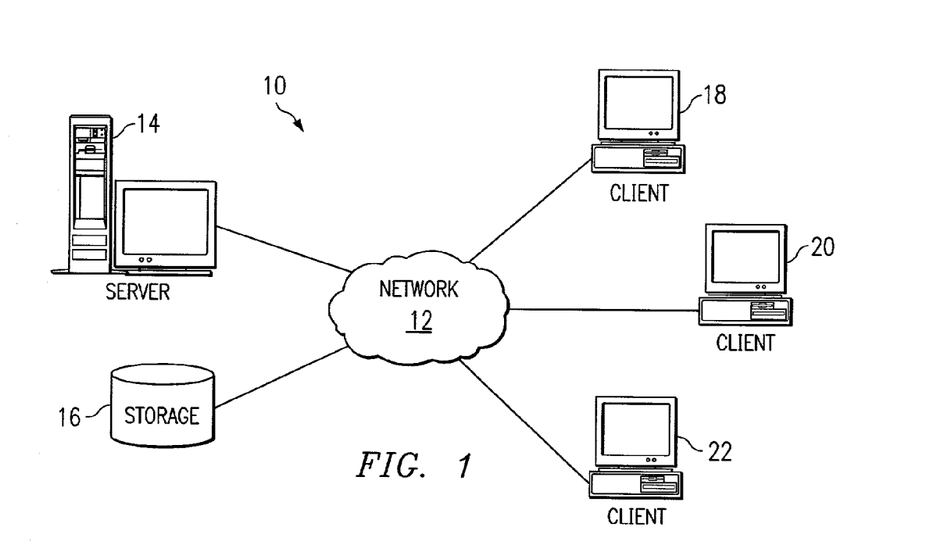
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
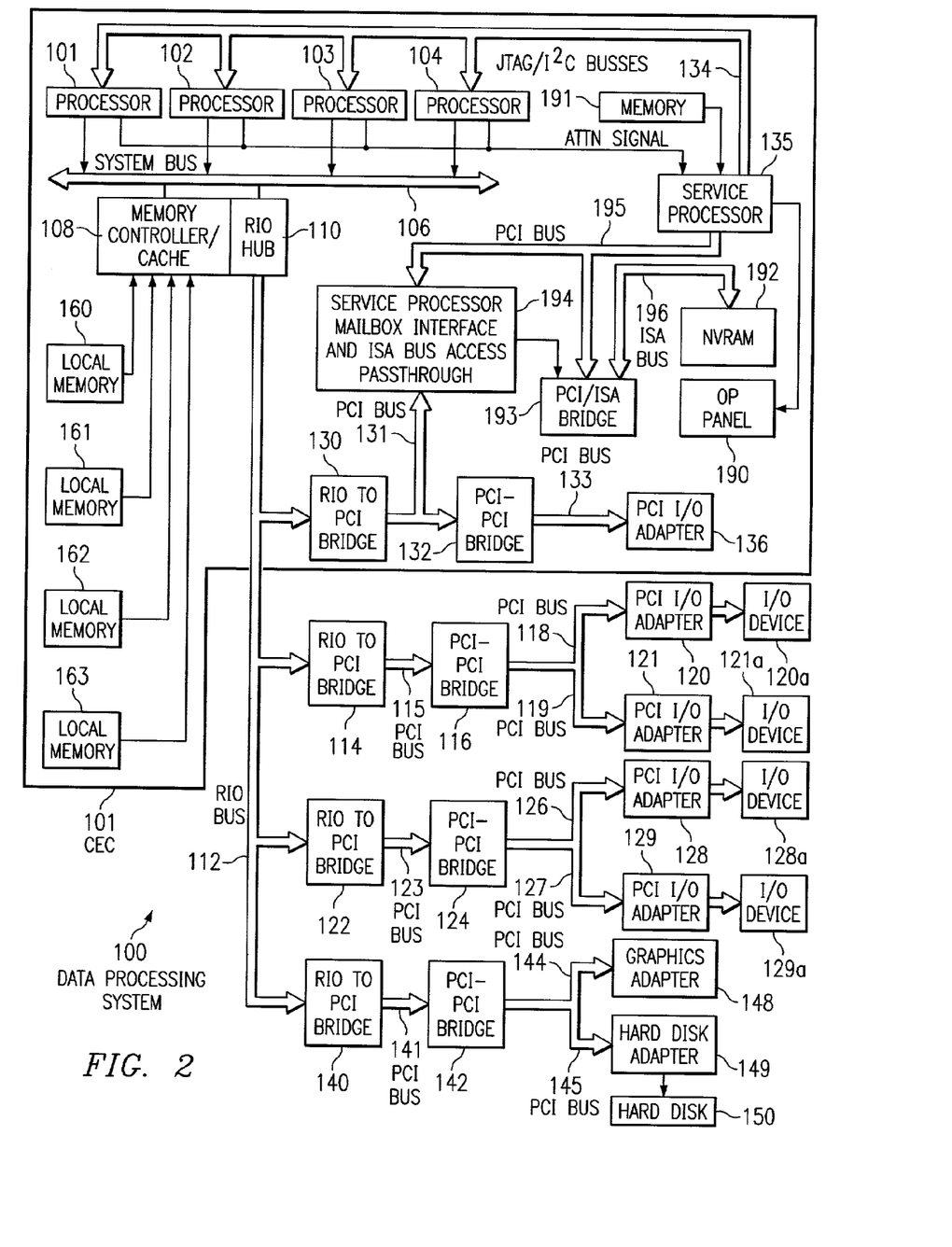
FIG. 2 is a more detailed block diagram of a data processing system in which the present invention may be implemented in accordance with the present invention.

FIG. 2 is a more detailed block diagram of a data processing system in which the present invention may be implemented. Data processing system 100 is a logically partitioned system. Data processing system 100 includes a central electronic complex 101 which includes logically partitioned hardware. CEC 101 includes a plurality of processors 101, 102, 103, and 104 connected to system bus 106. Also connected to system bus 106 is memory controller/cache 108, which provides an interface to a plurality of local memories 160–163. Remote Input/Output (RIO) hub 110 is connected to system bus 106 and provides an interface to RIO bus 112. Memory controller/cache 108 and RIO hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition.

RIO to Peripheral component interconnect (PCI) Host bridge 114 connected to I/O bus 112 provides an interface to PCI local bus 115. A number of Input/Output adapters 120–121 may be connected to PCI bus 115 through the use of PCI—PCI bridge 116. Typical PCI—PCI bridge implementations will support between four and eight I/O adapters (i.e. expansion slots for add-in connectors). Each I/O Adapter 120–121 provides an interface between data processing system 100 and input/output devices. An I/O device 120a is coupled to I/O adapter 120, and an I/O device 121a is coupled to I/O adapter 121.

An additional RIO to PCI host bridge 122 provides an interface for an additional PCI bus 123. PCI bus 123 through the use of PCI—PCI bridge 124 is connected to a plurality of PCI I/O adapters 128–129 by a PCI bus 126–127. An I/O device 128a is coupled to I/O adapter 128, and an I/O device 129a is coupled to I/O adapter 129.

A memory mapped graphics adapter 148 may be connected to I/O bus 112 through RIO to PCI Host Bridge 140 and PCI—PCI bridge 142 via PCI buses 144 and 145 as depicted. Also, a hard disk 150 may also be connected to RIO bus 112 through RIO to PCI Host Bridge 140 and PCI—PCI bridge 142 via PCI buses 141 and 145 as depicted.

A RIO to PCI host bridge 130 provides an interface for a PCI bus 131 to connect to I/O bus 112. PCI bus 131 connects RIO to PCI host bridge 130 to the service processor mailbox interface and ISA bus access pass-through logic 194 and PCI—PCI bridge 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and RIO hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and RIO hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs).

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
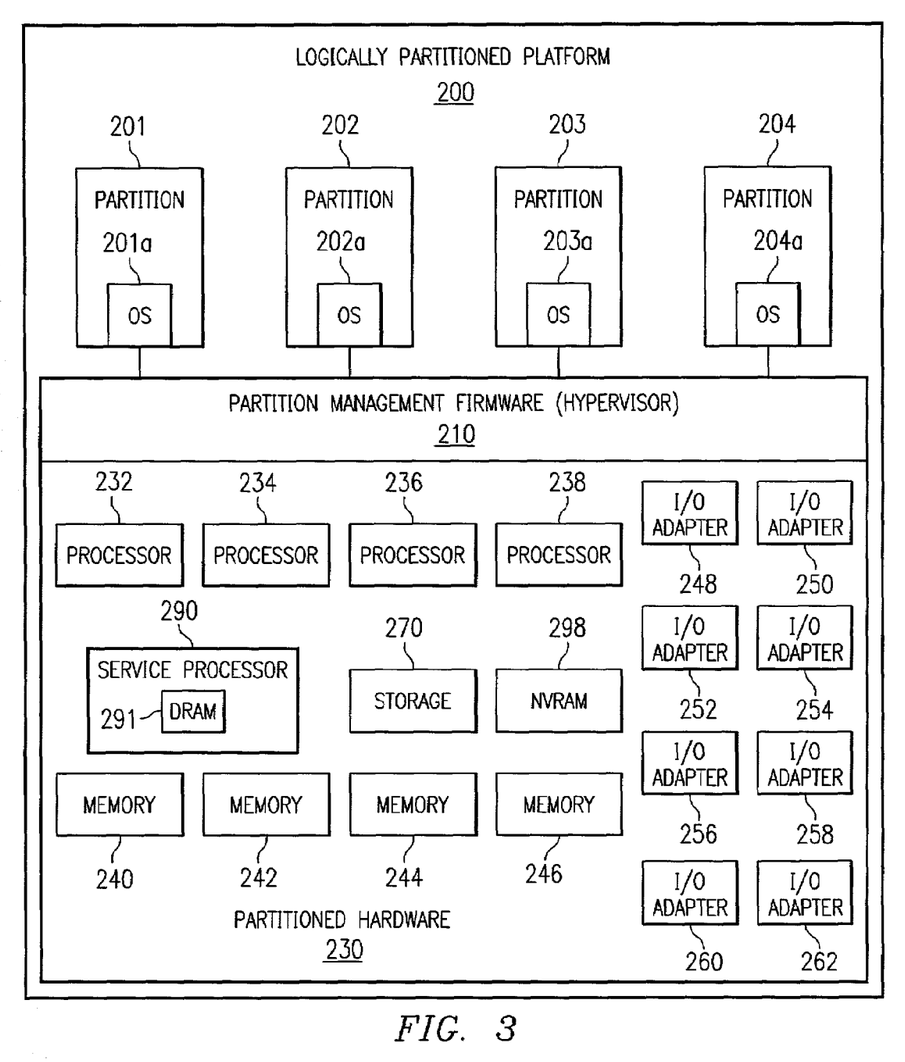
FIG. 3 is a block diagram of an exemplary logically partitioned platform in which the present invention may be implemented.

FIG. 3 is a block diagram of an exemplary logically partitioned platform is depicted in which the present invention may be implemented. Logically partitioned platform 200 includes partitioned hardware 230, partition management firmware, also called a hypervisor, 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a either through virtualizing of hardware resources or providing atomic access of shared system resources of logically partitioned platform 200. Hypervisor 210 may attach I/O devices through I/O adapters 248–262 to single virtual machines in an exclusive mode for use by one of OS images 201a–204a.

Figure 4:
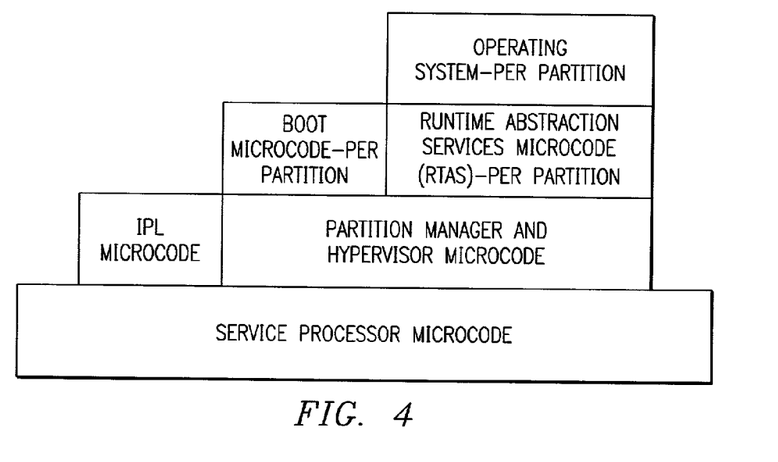
FIG. 4 is a block diagram of a time-based view of the various code components utilized at runtime and during the execution of a reboot for a logically partitioned system in accordance with the present invention.

FIG. 4 is a block diagram of a time-based view of the various code components utilized during the execution of a reboot for a logically partitioned system in accordance with the present invention. When the power is cycled on after being off, all partition hardware components are initialized, or reset, to their power-on hardware state. This "power-on" hardware state is a predetermined state. When the partition hardware components are reset to their power-on state, the components have no stored history or knowledge of prior processing. There are no outstanding or pending I/O requests. Once the components are reset to their power-on hardware state, there is no unsolicited I/O activity, either being transmitted to or from a processor or I/O adapter.

The service processor code executes on the service processor and tests and initializes the partition hardware using the JTAG/I2C interface. It next loads the IPL microcode and the partition manager and hypervisor microcode into system memory, and starts the system processors to begin execution of the IPL microcode.

The IPL microcode, partition manager and hypervisor microcode, boot microcode, Runtime Abstraction Services microcode (RTAS), and operating system execute on the host processors. There is a separate copy of the boot microcode, Runtime Abstraction Services Microcode (RTAS), and operating system for each partition.

The IPL microcode initializes the system's I/O adapters using the system bus, the RIO bus and PCI bus interfaces. Next, the IPL microcode transfers control to the partition manager which assigns system resources to each partition according to a previously stored user definition. The partition manager then activates the user defined partitions and passes control to the boot microcode for each activated partition.

Within each partition, the boot microcode locates and loads the operating system traversing the partition's I/O. When a warm reboot of a partition is initiated from the partition's operating system, it is forwarded to the partition's copy of RTAS microcode for execution.

Figure 5:
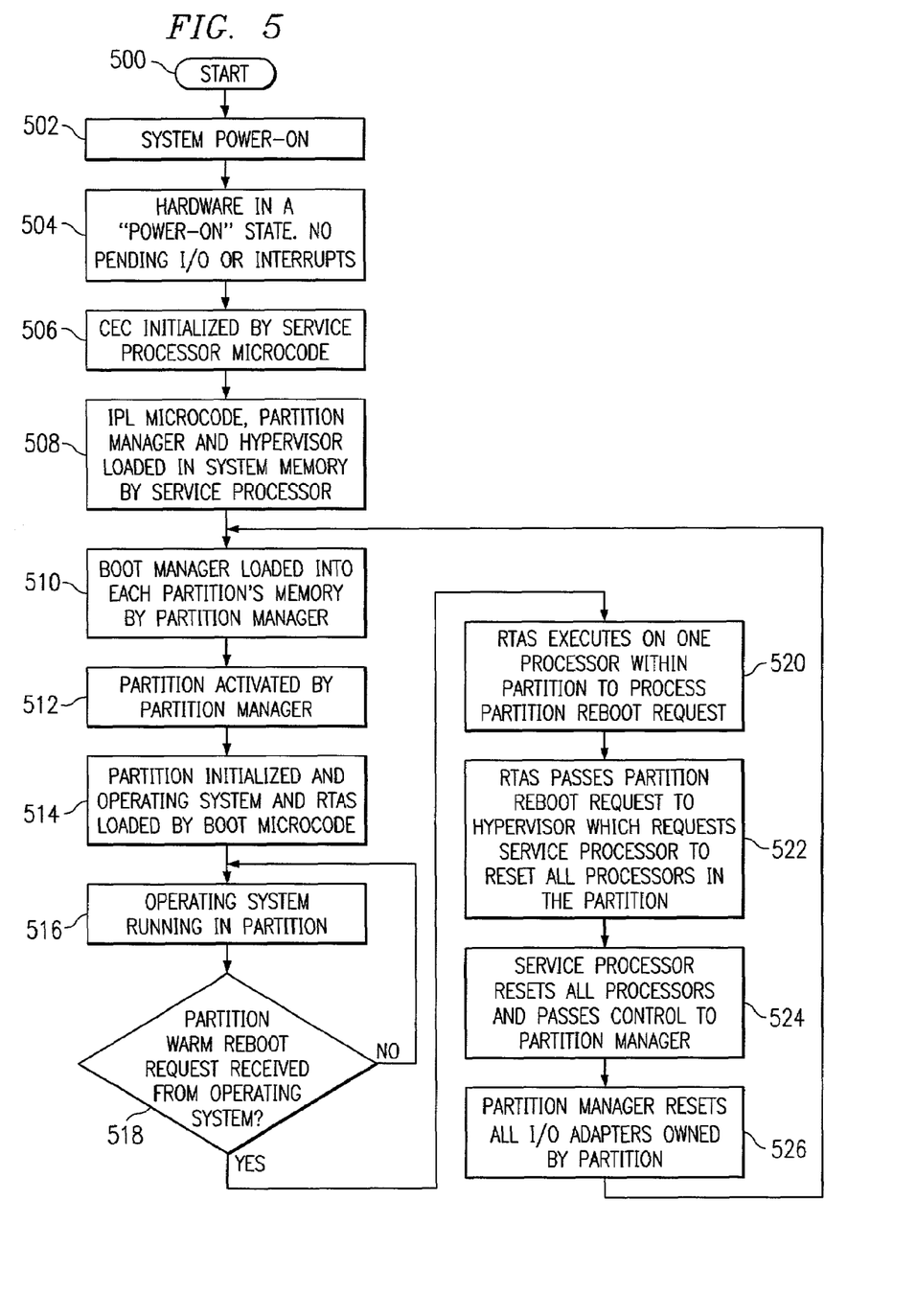
FIG. 5 depicts a high level flow chart which depicts setting partition hardware to a predetermined state prior to executing a warm reboot request in accordance with the present invention.

FIG. 5 illustrates a high level flow chart which depicts setting partition hardware to a predetermined state prior to executing a warm reboot request in accordance with the present invention. The process starts as depicted by block 500 and thereafter passes to block 502 which illustrates the system being powered-on. Next, block 504 depicts all of the partition hardware components being in a powered-on state. Thus, there is no pending I/O activity, either from the host processors or I/O adapters. There are no pending interrupts. Thereafter, block 506 illustrates central electronic complex 101 being initialized by the service processor microcode.

The process then passes to block 508 which depicts the IPL microcode and the partition manager and hypervisor microcode being loaded into system memory by the service processor. Next, block 510 illustrates the boot manager being loaded into each partition's memory by the partition manager. Block 512 then depicts each partition being activated by the partition manager. The process then passes to block 514 which illustrates each partition being initialized and the operating system and RTAS being loaded into the partition by the boot microcode. Thereafter, block 516 depicts the operating system running in the partition.

Next, block 518 illustrates a determination of whether or not a partition warm reboot request has been received from the operating system. If a determination is made that a partition warm reboot request has not been received from the operating system, the process passes back to block 516. Referring again to block 518, if a determination is made that a partition warm reboot request has been received, the process passes to block 520 which depicts the operating system loading the RTAS executing on one processor within the partition to process the partition warm reboot request after having stopped all tasks/processes and informed other processors in the partitions of the pending reboot request so they may also stop pending tasks/processes.

Thereafter, block 522 illustrates the RTAS passing the partition warm reboot request to the hypervisor which then requests the service processor to reset all of the processors in the partition to a power-on state. Next, block 524 depicts the service processor resetting all of the processors to a power-on state and then passing control to the partition manager which executes on the partition processor which requested the reboot. At this time, the processors are not transmitting any I/O communications. Thereafter, block 526 illustrates the partition manager resetting all I/O adapters owned by the partition to a power-on state. Thus, the I/O adapters are not transmitting or expecting to receive any I/O communications. All I/O activity is therefore halted at this time. The process then passes back to block 510.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for executing a reliable warm reboot of one of a plurality of logical partitions included in a logically partitioned data processing system, said system including partition hardware that is logically allocated to said plurality of logical partitions, said method comprising the steps of:

receiving, within one of said plurality of logical partitions, a request to reboot said one of said plurality of logical partitions;

logically allocating a subset of said partition hardware to said one of said plurality of logical partitions, said subset including multiple processors that are logically allocated to said one of said plurality of logical partitions;

setting said subset of said partition hardware to a predetermined state prior to executing said request, said step of setting said subset to said predetermined state including setting said multiple processors to a power-on state prior to executing said request;

executing said request within said one of said plurality of logical partitions to reboot said one of said plurality of logical partitions, said one of said plurality of logical partitions being rebooted without rebooting other ones of said plurality of logical partitions wherein said entire data processing system is not rebooted when said one of said plurality of logical partitions is rebooted, wherein the step of setting said subset of said partition hardware to a predetermined state prior to executing said request further comprises the step of resetting said multiple processors included in said one of said plurality of logical partitions; and allocating at least one I/O adapter to said one of said plurality of logical partitions wherein the step of setting said subset of said partition hardware to a predetermined state prior to executing said request further comprises the step of resetting said at least one I/O adapter.

2. The method according to claim 1, wherein the step of resetting said at least one I/O adapter further comprises the step of eliminating within said at least one I/O adapter a history of execution by said at least one I/O adapter.

3. The method according to claim 1, wherein the step of resetting said multiple processors further comprises the step of causing said at least one I/O adapter to cease transmitting I/O requests.

4. A system for executing a reliable warm reboot of one of a plurality of logical partitions included in a logically partitioned data processing system, said system including partition hardware that is logically allocated to said plurality of logical partitions, comprising:

one of said plurality of logical partitions receiving a request to reboot said one of said plurality of logical partitions;

a subset of said partition hardware being logically allocated to said one of said plurality of logical partitions, said subset including multiple processors that are logically allocated to said one of said plurality of logical partitions;

said subset of said partition hardware being set to a predetermined state, including said multiple processors being set to a power-on state, prior to executing said request;

said one of said plurality of logical partitions executing said request to reboot said one of said plurality of logical partitions, said one of said plurality of logical partitions being rebooted without rebooting other ones of said plurality of logical partitions wherein said entire data processing system is not rebooted when said one of said plurality of logical partitions is rebooted;

at least one I/O adapter being allocated to said one of said plurality of logical partitions;

said at least one I/O adapter being reset;

said partition hardware including a service processor;

said service processor for resetting said multiple processors included in said one of said plurality of logical partitions; and said service processor for resetting said at least one I/O adapter, said at least one I/O adapter being allocated to said one of said plurality of logical partitions.

5. A computer program product for executing a reliable warm reboot of one of a plurality of logical partitions included in a logically partitioned data processing system, said system including partition hardware that is logically allocated to said plurality of logical partitions, said computer program product comprising:

instruction means for receiving, within one of said plurality of logical partitions, a request to reboot said one of said plurality of logical partitions;

instruction means for logically allocating a subset of said partition hardware to said one of said plurality of logical partitions, said subset including multiple processors that are logically allocated to said one of said plurality of logical partitions;

instruction means for setting said subset of said partition hardware to a predetermined state prior to executing said request, said instruction means for setting said subset to said predetermined state further including setting said multiple processors to a power-on state prior to executing said request;

instruction means for executing said request within said one of said plurality of logical partitions to reboot said one of said plurality of logical partitions, said one of said plurality of logical partitions being rebooted without rebooting other ones of said plurality of logical partitions wherein said entire data processing system is not rebooted when said one of said plurality of logical partitions is rebooted;

wherein said instruction means for setting said subset of said partition hardware to a predetermined state prior to executing said request further comprises instruction means for resetting said multiple processors included in said one of said plurality of logical partitions;

instruction means for allocating at least one I/O adapter to said one of said plurality of logical partitions; and wherein said instruction means for setting said subset of said partition hardware to a predetermined state prior to executing said request further comprises instruction means for resetting said at least one I/O adapter.

6. The product according to claim 5, wherein said instruction means for resetting said at least one I/O adapter further comprises instruction means for eliminating within said at least one I/O adapter a history of execution by said at least one I/O adapter.

7. The product according to claim 5, wherein said instruction means for resetting said multiple processors further comprises instruction means for causing said at least one I/O adapter to cease transmitting I/O requests.

* * * * *